Figure 1:
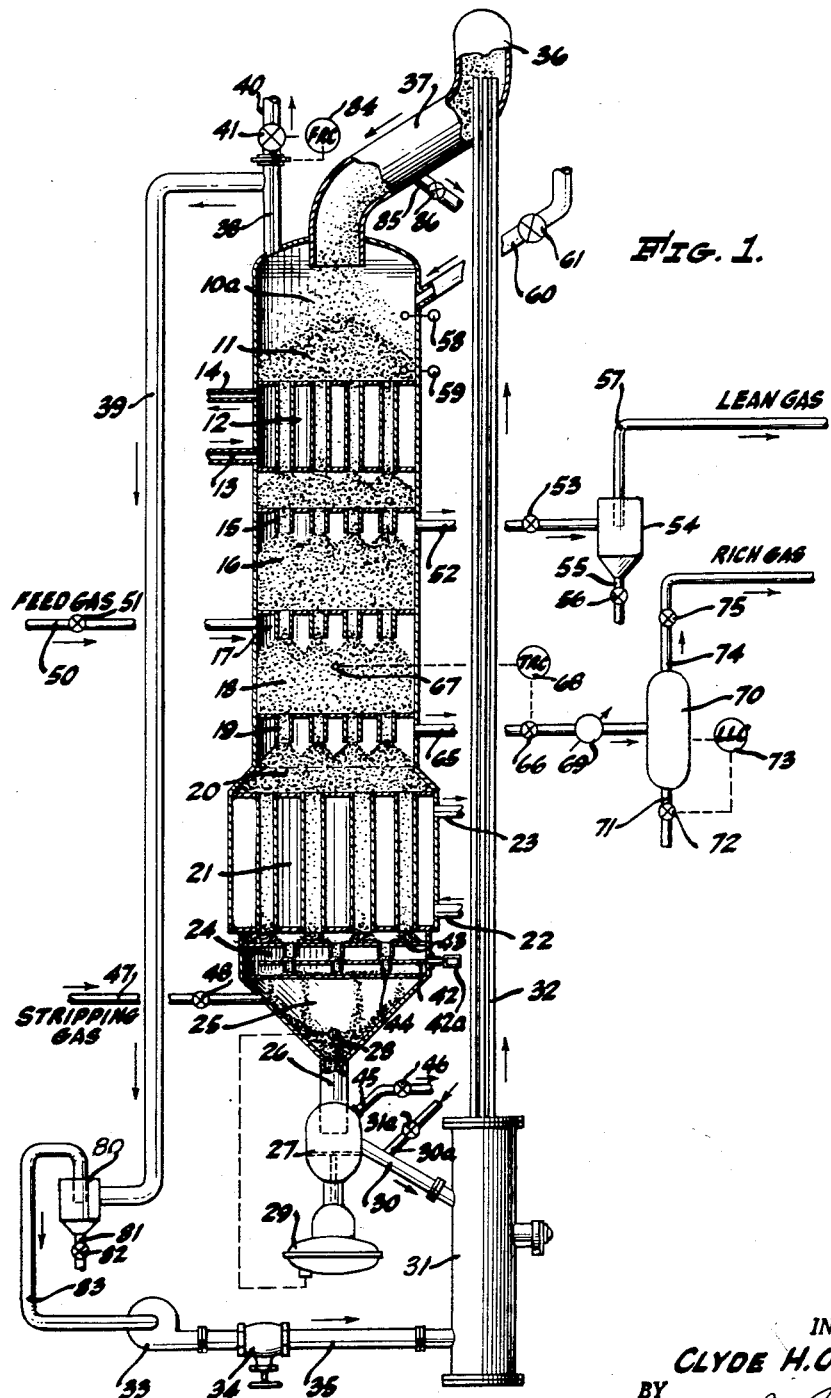

Jan. 19, 1960  C. H. O. BERG  2,921,817
ADSORPTION PROCESS AND APPARATUS
Original Filed April 5, 1948  4 Sheets-Sheet 1

INVENTOR.
CLYDE H.O. BERG.
BY
ATTORNEY

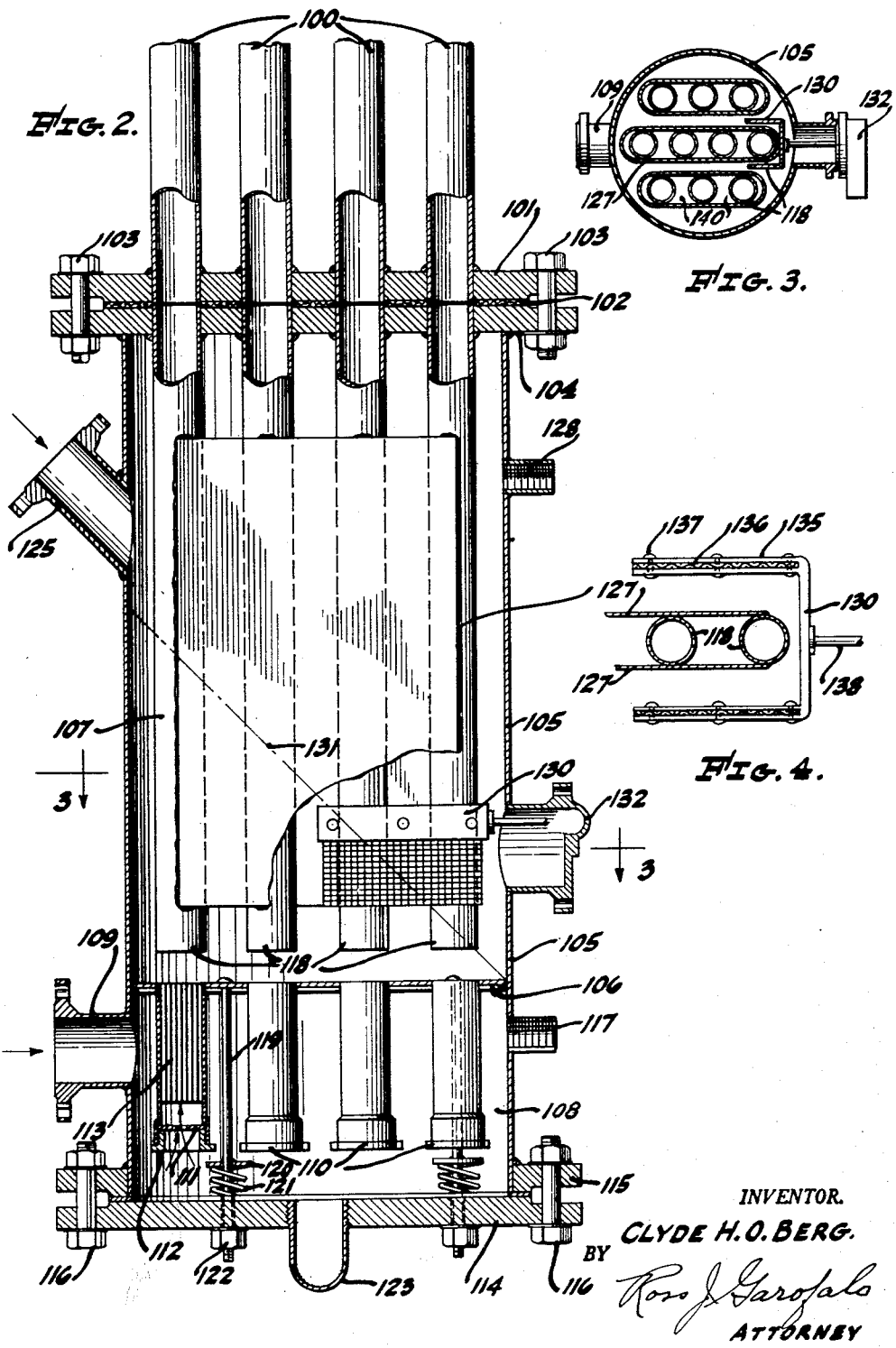

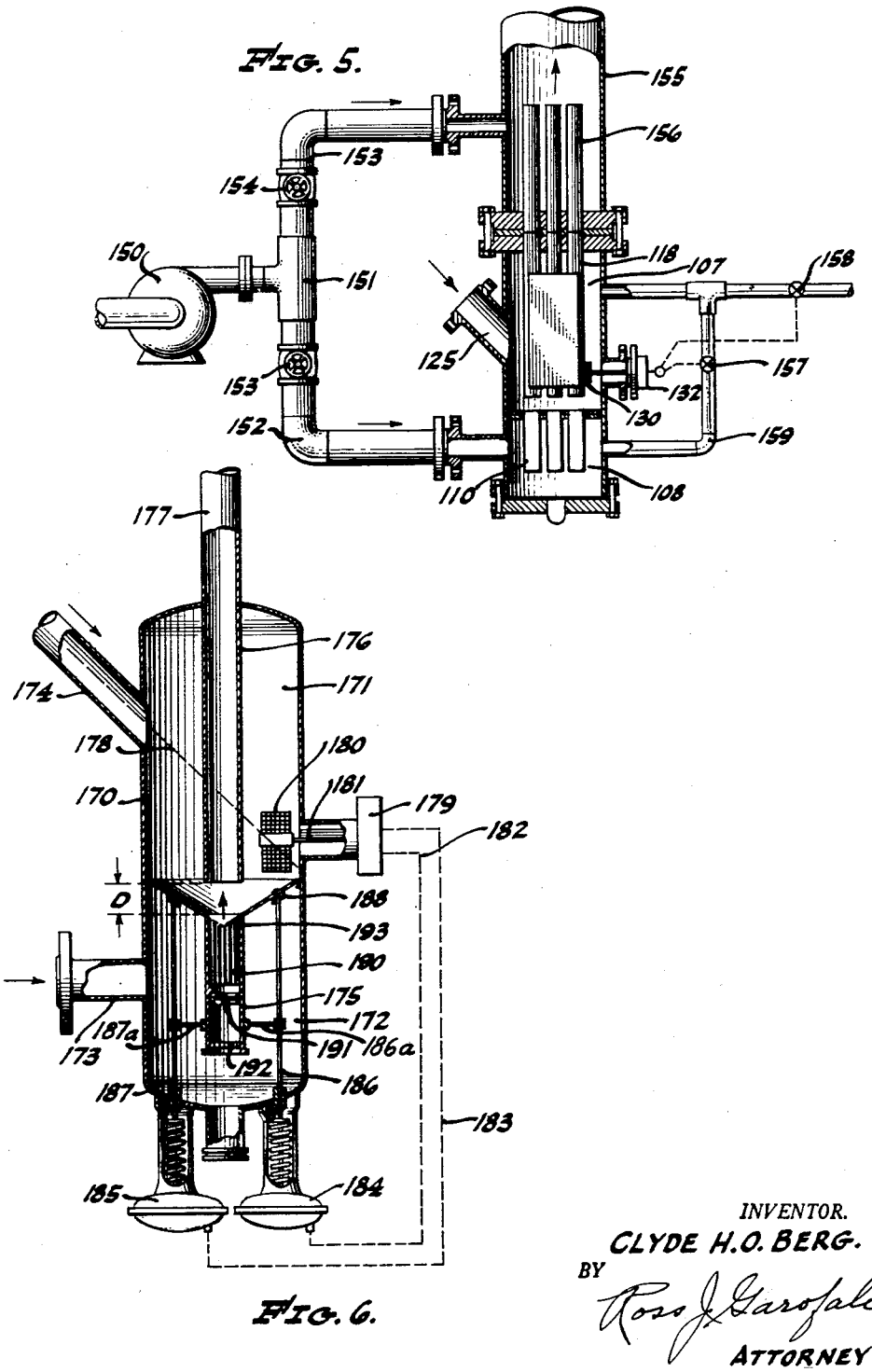

United States Patent Office 2,921,817
Patented Jan. 19, 1960

2,921,817

ADSORPTION PROCESS AND APPARATUS

Clyde H. O. Berg, Long Beach, Calif., assignor to Union Oil Company of California, Los Angeles, Calif., a corporation of California Original application April 5, 1948, Serial No. 18,913. Divided and this application March 6, 1953, Serial No. 340,795

26 Claims. (Cl. 302—53)

This invention relates to the separation of gaseous mixtures by continuous selective adsorption and in particular to a process for selective adsorption improved by the incorporation of an efficient and more easily controlled method for the conveyance and circulation of the granular adsorbent. Although the conveyance method has proved highly effective in increasing the efficiency and ease of operation of the selective adsorption process, it may also be applied with satisfactory results to the movement of other granular materials in other processes. The present invention also relates to improved methods for handling granular solids such as those employed in continuous or discontinuous selective adsorption processes, catalytic processes, and treating processes.

There are numerous operations in which the movement of finely ground, crushed, powdered or other granular solids is required. Nearly any industrial operation or process in which the raw materials, reagents, intermediate products, final products, by-products are solids requires facilities for transporting such solids from one place to another. This is true in metallurgical processes, clarification processes involving adsorption, catalytic processes, miscellaneous grinding, screening and classification processes, the manufacture of plastics and many others. In nearly all of these, application of the present invention may be employed to advantage.

Selective adsorption processes for the separation of gaseous mixtures and catalytic processes for the manufacture of synthetic fuels and synthetic organic chemicals may employ a continuously moving bed of granular adsorbent or catalyst which is recirculated through a vessel or vessels. In such a process the flowing solid may pass downwardly by gravity through a tower, column or other vessel to the bottom from which it is removed and conveyed to a reactivation or revivification zone, or it may be recirculated to the top of the vessel from which it was removed. The conveyance of these solids is of the utmost importance to the process and it has been accomplished heretofore by means of elevators, screws, or other similar mechanical means.

The present invention is directed toward an improved method for the pneumatic or gas lift movement of such granular solids which when incorporated in the selective adsorption process results in marked improvements.

It is a primary object of this invention to provide an improved selective adsorption process for the separation of gaseous mixtures in which the improved means of solids conveyance of this invention is employed.

It is another object of this invention to provide an improved method for the conveyance of granular solids in which the solids are transported in a moving gas stream as a gas-solid suspension.

Another object of this invention is to provide an improved pneumatic conveyor in which substantially reduced gas velocities are permitted thereby effectively reducing attrition loss of the solids being moved.

A further object of this invention is to provide an easily controlled pneumatic method for transporting granular solids while simultaneously elutriating fines from the circulated stream.

An additional object of this invention is to improve the efficiency and the ease of control of processes employing moving beds of solid granular materials and in particular to improve the efficiency of the continuous selective adsorption process for the separation of gaseous mixtures.

Another object of this invention is to provide an improved apparatus for the movement of divided solids substantially without attrition loss wherein the solids are suspended in a moving gas stream and passed in any direction.

Other objects and advantages of this invention will become apparent to those skilled in the art as the description thereof proceeds.

Briefly, the present invention comprises an improved selective adsorption process in which a moving bed of granular adsorbent is contacted with the gaseous mixture to be separated in an adsorption zone to form a rich adsorbent and a lean gas. The lean gas is removed as a product fraction from the adsorption zone and the rich adsorbent is indirectly heated and contacted with a stripping gas in a desorption zone to form a rich gas and a lean adsorbent. The lean adsorbent is removed from the desorption zone, suspended in a lift gas, and conveyed in a conduit to a separating zone in which the lean adsorbent is separated from the lift gas. The lift gas is subsequently employed to elutriate adsorbent fines from the adsorbent and the elutriated adsorbent is returned for reuse to the adsorption zone.

The process of selective adsorption is based upon the preferential adsorption phenomena exhibited by certain granular solid adsorbents in which some constituents of a gaseous mixture are adsorbed more strongly than other constituents. In general, those constituents having the higher molecular weights, the higher boiling points, or the higher critical temperatures are adsorbed more strongly. Distinct advantages are noted in the selective adsorption process over the conventional absorption, extraction and distillation processes in separating certain gaseous mixtures. Compared to the extreme conditions sometimes necessary in conventional processes, gaseous mixtures may be separated by the selective adsorption process at substantially atmospheric temperatures and pressures, with moderate pressures such as between 10 and several hundred pounds per square inch absolute and moderate temperatures as from between 80° F. and 500° F.

The present invention further comprises an improved method for suspending divided solids in gases and an improved method for the conveyance of divided solids in the form of gaseous suspensions. In addition, this invention comprises an apparatus for the separation of gaseous mixtures by continuous selective adsorption in which apparatus for conveying divided solids according to this invention is employed.

Figure 7:
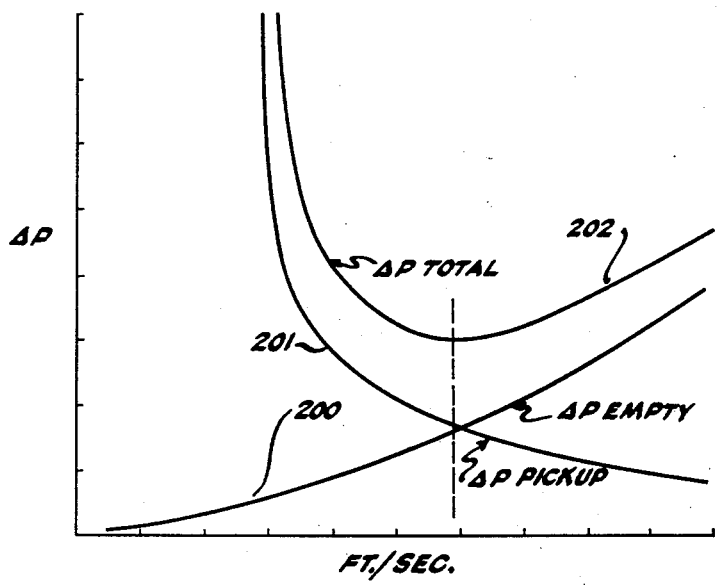
Figure 8:
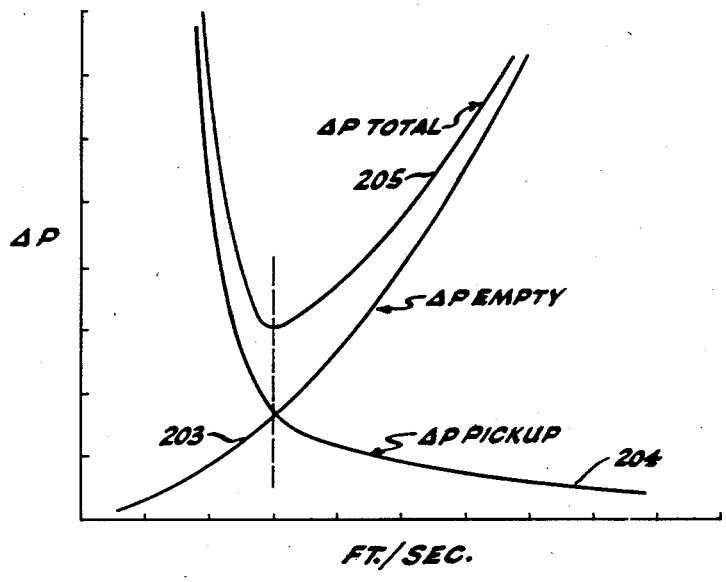

The principal advantages of the solids conveyance method and apparatus of this invention rest primarily in the ease of control and the substantial reduction in attrition rate of the solid being handled. In adsorption and catalytic processes, particularly expensive materials are often handled which is further complicated by the fact that the materials handled must desirably have a particular mesh size. With handling, granular solid materials are subject to abrasive actions both upon other particles as well as upon the surfaces of equipment in which they are handled. Thus, attrition reduces the size of the particles and gives rise to an accumulation of "fines." Since these fines often have detrimental effects in moving bed operations (channeling and increased resistance to gas flow) they are desirably removed and in some cases discarded. The reduction of the minimum operable velocity with its attendant reduction in the velocity with which the gaseous suspension of solids must be handled to prevent settling markedly reduces the quantity of fines formed through attrition and consequently reduces the quantity of make-up adsorbent or catalyst required in a given system for a given operation. Details of the method and apparatus of the present invention are most easily described in conjunction with a given application as is shown in the accompanying drawings wherein:

Figure 1 depicts the improved selective adsorption process in which the improved conveyance method is employed to circulate the solid granular adsorbent through the vertical column, Figure 2 shows a cross section of an elevation view of the gas inlet and solids inlet zones of the improved conveyance apparatus in which a conduit comprising a multiplicity of tubes as a vertical lift line is employed, Figure 3 shows a plan view of one configuration of tubes which may be employed in the solids and gas inlet zones, Figure 4 shows a plan view of a grid structure which may be employed to control the level of solids present in the solids inlet zone during continuous operation, Figure 5 shows more clearly details involved in two modifications for control of the lift line, Figure 6 shows a simplified vertical cross section of another modification of the induction zone and a means for its control, and Figures 7 and 8 show operation curves of the conventional compared with the improved lift line of this invention.

The term "stalling velocity" used in the following description is defined as the minimum lineal velocity of lift gas in the lift line at which the gas-solids suspension may be transported without settling. It is also the velocity at which the lift line differential pressure is at a minimum.

The terms "lift line velocity" and "lifting velocity" are defined as the lineal lift gas velocity in an operating lift line.

The term "settling velocity" is defined as the rate at which a particle falls by gravity through a medium comprising still lift gas. For 12 to 30 mesh charcoal in air, the settling velocity is about 10 feet per second and varies with other solids and gases depending upon density of the solid and gas and upon the viscosity of the gas.

It should be understood that although the combination of the pneumatic conveyance method of this invention with the adsorption process is of unusual merit, as will be apparent from the following description, this description is not intended to limit the use of the conveyance method and apparatus of this invention to use with such adsorption processes alone since the conveyance described hereinafter may be applied to many processes and apparatuses in which powdered, granulated, or other divided solids are handled.

Referring now more particularly to Figure 1, a brief description of one modification of the selective adsorption process follows:

The apparatus in which continuous selective adsorption may be carried out is shown in cross section in Figure 1. Selective adsorption column 10 is provided at successively lower intervals with elutriation zone 10a, adsorbent hopper or storage zone 11, adsorbent cooling zone 12 provided with inlet 13 and outlet 14, lean gas disengaging zone 15, adsorption zone 16, feed gas engaging zone 17, rectification zone 18, rich gas disengaging zone 19, steaming zone 20, heating zone 21 provided with inlet 22 and outlet 23, adsorbent flow control zone 24 and bottom zone 25. Flow control zone comprises a mechanical feeder in which a movable plate 42 is given a reciprocating motion by motive means 42a. The tubes of movable plate 42 are alternately filled when aligned with tubes of stationary tray 43 and emptied through perforated tray 44 when aligned with the holes therein.

This mechanical feeder is more clearly described and claimed in my copending application, Serial No. 618,347 filed September 24, 1945, now U.S. Patent No. 2,544,214.

The solid granular adsorbent passes downwardly by gravity as a dense phase in a moving bed successively through the aforementioned zones from adsorbent hopper 11 to flow control zone 24 and collects in bottom zone 25. The adsorbent is removed from bottom zone 25 through sealing leg 26 and is passed through adsorbent flow control valve 27. Valve 27 serves to maintain bottom zone 25 partly full of adsorbent and is actuated by level control means 28 operating through pneumatic or electrical controller 29 causing valve 27 to open or close. The adsorbent passing through valve 27 passes downwardly by gravity through transfer line 30 and is introduced into induction zone 31. In induction zone 31, hereinafter more fully described, the adsorbent contacts an upwardly flowing stream of gas to form an adsorbent-gas suspension. The lift gas is introduced into induction zone 31 by means of lift gas blower 33 controlled by valve 34 through line 35. The lift gas suspension formed in induction zone 31 passes upwardly through lift line 32 which comprises any form of hollow conduit. In Figure 1 the conduit is shown as a multiplicity of vertical tubes. The lift-gas suspension is introduced by means of lift line 32 into impactless separator 36 wherein the lift gas-adsorbent suspension is separated. The lift gas and adsorbent pass downwardly as substantially independent phases through transfer line 37 and are introduced into elutriation zone 10a of selective adsorption column 10 wherein the adsorbent cycle is completed. The adsorbent settles into adsorbent hopper 11 and the lift gas is removed together with elutriated adsorbent fines by means of line 38 from elutriation zone 10a of selective adsorption column 10 and is returned by means of lift gas return line 39 to the inlet of separator 80.

The separated fines, smaller than the minimum desired size, e.g., in this case, about 60 mesh are removed from separator 80 by means of line 81 controlled by valve 82 and the suspended solid-free lift gas is passed by means of line 83 into lift gas blower 33. Removal of adsorbent fines in this manner substantially completely eliminates blower rotor erosion problems. The maximum average particle size of the fines thus removed from the circulating adsorbent stream is determined by the lift gas velocity in the top of column 10 above hopper 11.

Line 38 carrying the lift gas recirculated to convey the adsorbent from the bottom to the top of the column also carries the purge gas which passes upwardly through cooling zone 12. The purge gas flow rate is controlled by flow recorder controller 84 which actuates valve 41 in line 40. The gas thus continuously removed may be returned with the feed gas, produced as a product gas, sent to fuel, flared, or otherwise disposed of in a manner not shown. The removal may, if desired, be made intermittently, but continuous removal is preferred.

The lift gas velocity in lift line 32 is maintained at about 15 feet per second and the gas velocity in the top of column 10 is maintained at a value consistent with a substantially complete retention of fines in suspension smaller than the minimum size desired. Thus, the relative diameter of elutriation zone 10a with respect to the lift line also governs the degree of elutriation obtained by maintaining a predetermined lift gas velocity in the elutriation zone. The elutriated fines are removed from the lift gas recycle stream as previously described in separator 81.

Line 85 controlled by valve 86 is provided to pass the adsorbent from column 10 into a storage bin or through a reactivation vessel. A small portion of the circulating adsorbent, between about 1% and 25% by weight, is subjected to a continuous high temperature steam treatment to remove higher molecular weight material which may be present in the adsorbent.

A portion of the lift gas introduced into induction zone 31 passes upwardly through transfer line 30 countercurrent to the downwardly flowing adsorbent. This gas is removed from flow control valve 27 by means of line 45 controlled by valve 46 to prevent the upflow of lift gas into the lower part of the selective adsorption column. Simultaneously a portion of the stripping gas introduced into bottom zone 25 by means of line 47 controlled by valve 48 flows downwardly through sealing leg 26 concurrently with the adsorbent and this portion of stripping gas is also removed by means of line 45 controlled by valve 46 as a seal gas which effectively isolates the lower portion of the selective adsorption column from the induction zone of the lift gas system.

A further description of the apparatus shown in Figure 1 will be conducted in the form of a practical example of commercial operation showing the use of the improved selective adsorption process of the present invention in conjunction with a thermal cracking operation for the production of ethylene. Ethylene production in large volumes may be realized from the cracking of normally liquid or gaseous petroleum fractions such as gas oil, propane, and the like, or the cracked gases from other thermal or catalytic cracking operations may be treated for ethylene recovery.

In this case gas oil having a boiling range of between about 300° F. and 760° F. was pumped from a storage tank by means of a suitable feed pump at a flow rate controlled by a control valve and introduced into a vaporizer. The vaporizer substantially completely vaporized the gas oil and the vapor was removed and passed through a separator wherein any unvaporized liquid was separated. The vapor, free of entrained liquid, was mixed with steam at a rate controlled by a control valve and the gas oil vapor-steam mixture was passed through a cracking furnace. Water and gas oil in the ratio of about two pounds of oil per pound of water may be vaporized simultaneously in the vaporizer if desired. The vapor phase cracking may be conducted at temperatures between about 1000° F. and 2500° F. depending upon the severity of cracking desired and the presence of steam tends to inhibit coking conditions. The cracking furnace effluent was cooled by exchange with the incoming gas oil. It may also be quenched by the direct introduction of water or cooled by vaporizing water in a waste heat boiler to supply steam needed in the cracking reaction, or cooled in a similar manner. The cooled effluent was passed into a separator wherein the water condensate separated to the bottom and the uncracked oil formed as an immiscible layer. By means of a differential liquid level controller and a suitable control valve the water condensate was continuously removed from the separator at a controlled rate. The rate at which uncracked oil was removed from the separator was controlled by a liquid level controller and a suitable control valve. The cracked gas formed during the cracking reaction was removed from the upper end of the separator at a rate controlled by a back pressure regulator.

The cracked gas containing saturated and unsaturated hydrocarbons was then compressed to a pressure of about 600 pounds per square inch gauge in a multistage compressor provided with interstage cooling facilities and means for separating condensate formed during compression in each stage. The condensate thus formed comprises a mixture of water and hydrocarbons. The compressed gas was then passed through a dehydration tower wherein remaining traces of moisture are removed by adsorption on a solid granular desiccant. The desiccant may be activated bauxite, activated aluminum oxide, silica gel, charcoal, or the like. The dry gas was then cooled to a temperature of about 0° F. or lower, and introduced into a demethanizer distillation tower operating at a pressure of about 600 pounds per square inch gauge and employing a reflux temperature of about −150° F. These reflux temperatures may be obtained by evaporating liquid ethylene at near atmospheric pressure as the refrigerant. The evaporated ethylene was then compressed and condensed in indirect heat exchange with evaporating ammonia or propane. The feed to the demethanizer is subcooled by indirect heat exchange with at least a portion of the demethanizer overhead.

The bottoms product from the demethanizer comprises ethylene and heavier hydrocarbons present in the cracking furnace effluent. This bottoms product is subsequently sent to a tower producing an overhead ethylene product. The bottoms product from the ethylene tower is employed as feed in an ethane tower producing an ethane overhead fraction, and the bottoms product from the ethane tower is employed as feed in a propylene tower which may produce pure propylene as an overhead product or a commercial propylene-propane fraction together with $C_4$s and heavier as a bottoms product. Other fractionation procedures may be applied to these materials.

The demethanizer tower overhead contained less than 10% by volume of ethylene since the pressure and reflux temperature are not sufficient to maintain a pure methane and hydrogen reflux at the top of that tower. To permit the reflux to at least partly condense under these conditions a small quantity of ethylene is allowed to go overhead in the demethanizer tower and an overhead product gas analysis shown below in Table 1 results.

TABLE 1

*Feed gas analysis*

| Ingredient: | Mol percent |
|---|---|
| Hydrogen | 39.8 |
| Nitrogen | 1.7 |
| Carbon monoxide | 0.9 |
| Oxygen | 0.1 |
| Methane | 51.3 |
| Carbon dioxide | 0.2 |
| Acetylene | 0.2 |
| Ethylene | 5.8 |
| Ethane | Trace |
| Total | 100.0 |

The selective adsorption process and apparatus developed to separate the ethylene from this feed gas employed 15,000 pounds of activated charcoal as the adsorbent which was circulated through the column at a rate of 18,000 pounds per hour. The selective adsorption column was self-supporting, 4.5 feet in diameter and 85 feet in height. A charcoal storage vessel 4.0 feet in diameter and 60 feet high was provided to hold make-up charcoal to be added as required to maintain a level in the top of the column and also to hold charcoal removed from the column during inspection.

The feed gas stream having the composition shown in Table 1 flowed at a rate of 73,900 s.c.f. (standard cubic feet) per hour and was available at 120 pounds per square inch gauge pressure and a temperature of −130° F.

The gas was depressured to 75 pounds per square inch gauge pressure and interchanged to atmospheric temperature to recover refrigeration. This gas was introduced through line 50 controlled by valve 51 into feed gas engaging zone 17. The gas thus introduced passes upwardly through adsorption zone 16 countercurrent to the downwardly flowing lean charcoal at a temperature of 120° F. The ethylene content of the feed gas is thus adsorbed along with a small proportion of carbon dioxide and methane which are less readily adsorbable. The charcoal temperature was raised to 150° F. by the ethylene adsorption. The major proportion of the methane and substantially all of the less readily adsorbable constituents remain as an unadsorbed lean gas.

The lean gas passes upwardly and enters lean gas disengaging zone 15. A portion of this lean gas is removed from lean gas disengaging zone 15 at 120° F. by means of line 52 controlled by valve 53 and is introduced into separator 54 wherein suspended charcoal fines are removed. The separated fines pass through line 55 controlled by valve 56 out of separator 54. The lean gas is removed from separator 54 at a rate of 44,825 s.c.f. per hour by means of line 57. The composition of the lean gas is as follows:

TABLE 2
Lean gas analysis

| Ingredient: | Mol percent |
| --- | --- |
| Hydrogen | 31.6 |
| Nitrogen | 1.4 |
| Carbon monoxide | 0.8 |
| Oxygen | 0.1 |
| Methane | 66.1 |
| Carbon dioxide | ---- |
| Acetylene | ---- |
| Ethylene | ---- |
| Ethane | ---- |
| Total | 100.0 |

The dew point of the lean gas product is very low, less than −100° F., made possible by the desiccating action of the adsorbent. This lean gas is passed through alumina driers during their cooling cycle to assist in reducing the temperature of the dehydrated desiccant without introducing moisture.

The remaining portion of the unadsorbed gases which is not removed with the lean gas comprises a purge gas which passes upwardly through the tubes of adsorbent cooling zone 12 countercurrent to the downwardly flowing charcoal into elutriation zone 10a. This gas serves to saturate the lean cool charcoal with the constituents of the lean gas product and also to dehydrate the lean charcoal. During the passage of this purge gas through cooling zone 12 a partial enrichment of the purge gas in the less readily adsorbable constituents occurs so that the purge gas passing into elutriation zone 10a from hopper 11 and leaving the upper portion of selective adsorption column 10 has the following composition:

TABLE 3
Purge gas analysis

| Ingredient: | Mol percent |
| --- | --- |
| Hydrogen | 61.8 |
| Nitrogen | 2.5 |
| Carbon monoxide | 1.3 |
| Oxygen | 0.2 |
| Methane | 33.7 |
| Carbon dioxide | 1.0 |
| Acetylene | ---- |
| Ethylene | 0.4 |
| Ethane | ---- |
| Total | 100.0 |

This gas may be produced as a third fraction, if desired, through lines 38 and 40 controlled by valve 41.

The volumetric rate of flow of the purge gas is 24,600 s.c.f. per hour. Comparison of the composition of the purge gas shown in Table 3 with the composition of the lean gas shown in Table 2 indicates that a substantial proportion of the methane present in the lean gas is adsorbed by the charcoal from the purge gas and that the hydrogen concentration nearly doubles. The composition of the purge gas shown in Table 3 is substantially the same as the composition of the lift gas employed for transporting charcoal removed from the bottom of selective adsorption column 10 to the top of the column. The lift gas is recirculated through the system at a rate of 271,000 s.c.f. per hour. The quantity of gas removed through line 40 controlled by valve 41 and flow recorder controller 84 is about 25,000 s.c.f. per hour.

The quantity of charcoal in the system at any given time is indicated by high level alarm 58 and low level alarm 59 provided in charcoal hopper 11. It is desirable to maintain a constant level of charcoal in hopper 11 and additional quantities of charcoal are introduced by means of line 60 controlled by valve 61 from a storage line, not shown but previously described, to maintain such a level of the charcoal at the desired position. This serves to insure the maintenance of a constant free volume in elutriation zone 10a. The total quantity of charcoal in the system is thus maintained at about 15,000 pounds.

A reactivator, not shown, is provided through which about 5% by weight of the charcoal flow is by-passed. The adsorbent is subjected to a high temperature steam treatment to maintain the adsorptivity of the charcoal. This charcoal is removed from transfer line 37 through line 85 controlled by valve 86 and passes through the reactivator. The treated charcoal is introduced by means of line 30a controlled by valve 31a into transfer line 30.

The rich charcoal formed in adsorption zone 16 containing adsorbed ethylene and small quantities of the less readily adsorbable constituents passes downwardly through feed gas engaging zone 17 and is introduced into rectification zone 18 wherein it is countercurrently contacted with a rich gas reflux consisting of substantially pure ethylene. This reflux serves to substantially completely desorb adsorbed quantities of methane from the rich charcoal leaving a rectified charcoal containing adsorbed reflux ethylene which raised the temperature to 210° F. The rectified charcoal thus formed passes downwardly through rich gas disengaging zone 19 into steaming zone 20 wherein it is heated to 365° F. by steam adsorption. The major portion of the adsorbed ethylene is preferentially desorbed in steaming zone 20 and the charcoal passes into heating zone 21. In heating zone 21 the charcoal is indirectly heated by means of flue gas or condensing vapors such as steam or mixtures of diphenyl and diphenyl oxide whereby the charcoal is heated to a temperature of about 510° F. Stripping gas is introduced at a rate of about 375 pounds per hour into bottom zone 25 by means of line 47 controlled by valve 48. A small portion of this steam passes downwardly and is removed as a seal gas through line 45, as previously described, while the major proportion passes upwardly through the tubes of heating zone 21 countercurrent to the downwardly flowing hot charcoal. By the combination of stripping steam and indirect heating, a substantially complete desorption of the remaining adsorbed ethylene is effected and the gas thus desorbed passes upwardly into rich gas disengaging zone 19. The charcoal carrying the adsorbed steam passes down through the tubes to hotter areas where the steam is desorbed. This stripping gas recycle amounts to about 1200 pounds per hour so that the total effective stripping gas rate is about 1575 pounds per hour.

A portion of the thus desorbed ethylene passes upwardly through rich gas disengaging zone 19 into rectification zone 18 wherein it serves as the rich gas reflux mentioned above. The remaining portion of rich gas is removed from rich gas disengaging zone 19 by means of line 65 controlled by automatic control valve 66. Control valve 66 is actuated by thermocouple 67 and temperature recorder controller 68. The presence of the rich gas reflux in rectification zone 18 exerts a temperature effect in conjunction with the preferential desorption of less readily adsorbable constituents from the rich charcoal by the rich gas reflux. The charcoal in equilibrium with the feed gas above thermocouple point 67 is at a temperature lower than that of the rectified charcoal in equilibrium with the rich gas reflux in rectification zone 18. The rich gas product passes through control valve 66 at a controlled rate and is introduced into rich gas cooler 69 wherein at least a portion of the stripping gas removed from rich gas disengaging zone 19 is condensed. The cooled rich gas product and the condensed stripping gas are introduced together into vapor liquid separator 70. The condensed stripped steam collects in the lower portion of separator 70 and is removed therefrom by means of line 71 controlled by valve 72 which in turn is actuated by liquid level controller 73. The condensate thus removed may, if desired, be returned to an evaporator and reintroduced as stripping gas by means of line 47. The rich gas product is removed from separator 70 by means of line 74 controlled by valve 75 at a rate of 4475 s.c.f. per hour. This ethylene stream is passed through activated aluminum oxide driers to remove remaining traces of moisture and may be combined with the ethylene product from the ethylene tower of the low temperature fractionation equipment if desired.

The composition of the rich gas product thus produced is given as follows:

TABLE 4

*Rich gas product analysis*

| Ingredient | Mol percent |
|---|---|
| Hydrogen | ---- |
| Nitrogen | ---- |
| Carbon monoxide | ---- |
| Oxygen | 0.1 |
| Methane | ---- |
| Carbon dioxide | 2.9 |
| Acetylene | 3.6 |
| Ethylene | 92.7 |
| Ethane | 0.7 |
| Total | 100.0 |

The lean stripped charcoal formed in heating zone 21 is conveyed through lift line 32 passed through elutriation zone 10a and is reintroduced into hopper 11 at a temperature of about 420° F. to be reused in the process.

The selective adsorption process above described effects nearly a 100% recovery of ethylene present in the feed gas and produces it as a rich gas product of nearly 93% purity, the remaining 7% being mostly $C_2$ hydrocarbon.

The degree of elutriation of "fines" in a circulating stream of granular solids conveyed by the methods of this invention is given by the following relation:

$$\text{percent elutriation} = \phi\left[\frac{(V)}{(D^{1.5})}(\rho^{0.3})(\mu^{0.4})\right]$$

where

V = gas velocity, ft. per sec., n the elutriation zone,
D = average diameter of elutriated particles, inches,
$\rho$ = lift gas density, lb. per cu. ft.
$\mu$ = lift gas viscosity, centipoises.

In the selective adsorption process, it is desirable to elutriate completely the 40–60 and higher mesh size fraction for which D=0.0121 and the factor $$\left[\frac{(V)}{(D^{1.5})}(\rho^{0.3})(\mu^{0.4})\right] = 71$$

From an analysis of the lift gas employed, the values of $\rho$ and $\mu$ are determined and the value V required is calculated from $$V = (71)(D^{1.5})(\rho^{-0.3})(\mu^{-0.4})$$

The lift gas velocity is maintained at a value at least that calculated from the equation immediately above. The quantity of lift gas circulated is then maintained to provide a gas velocity in elutriation zone 10a of at least V feet per second to effect a 100% elutriation of fines of 40–60 mesh and smaller. From the elutriation zone transverse area and the required gas velocity V, the volumetric requirement of lift gas may be determined and then the transverse area and diameter of the lift line are calculated from a consideration of the quantity of purge gas available and the permissible lift gas velocity in the lift line.

Thus, there is a close relation between the diameters of the elutriation zone and the lift line. The lift system is thus developed for each specific application to minimize attrition and effect a substantially complete and continuous fines elutriation. Similar relations hold for the conveyance of other granulated solids.

The efficiency of the elutriation operation conducted in elutriation zone 10a of Figure 1 above adsorbent hopper 11 was shown by the screen analysis of the circulating adsorbent after eight months of nearly continuous operation. The adsorbent, activated charcoal, showed less than 2.0% by weight of fine granules of 60 mesh or smaller in screen analyses made periodically of the circulating adsorbent stream as part of the control tests. The lift gas removed from the top of the column showed less than 0.1% by weight of solids were larger than 60 mesh size. These data show conclusively that highly efficient elutriation of fines was obtained.

In Figure 2 is shown a cross section of an elevation view of the induction zone 31 indicated in Figure 1. In this modification the conduit through which the gas-solid suspension is conveyed comprises a multiplicity of parallel tubes 100. The lower ends of these tubes are welded into flange 101 which is provided with gasket 102 and fastened by means of bolts 103 to flange 104 disposed at the upper end of the induction zone. The induction zone is provided with a cylindrical shell 105 which is divided by means of movable plate 106 into solids inlet zone 107 above, and gas inlet zone below.

Referring now more particularly to gas inlet zone 108, the lift gas is introduced through connection 109 which is directly connected to the lift gas blower not shown. The lift gas thus introduced passes into zone 108 and is distributed around the primary tubes 110. Primary tubes 110 are integrally attached to and extend downwardly from movable transverse plate 106 and are spaced on that plate in a regular geometric pattern. The lower extremity of primary tubes 110 is provided with an orifice plate 111 in which a single orifice or a multiplicity of small orifices may be provided. In this particular modification orifice plate 111 is held in place by means of threaded insert 112. It is preferred that the orifice plate be provided with a multiplicity of small sharp edged orifices rather than one large orifice, since a better flow distribution of lift gas in the primary tubes may be obtained. To facilitate this uniformity of flow, vanes 113 may be provided to further smooth out the lift gas flow.

Gas inlet zone 108 is closed at the bottom end by means of blind flange 114 which is firmly bolted to flange 115 by means of bolts 116. A portion of the lift gas introduced by means of coupling 109 passes upwardly at uniform flow rates through primary tubes 110 while the remaining portion passes through gas inlet zone 108 and out through coupling 117 which is provided to perform the necessary control operations hereinafter more fully described.

The position of movable plate 106 with respect to the lower extremities of secondary tubes 118 is of considerable importance and to provide flexibility of operation (and a means of control as hereinafter more fully described in connection with Figure 6), plate 106 is made adjustable by means of connecting rods 119 which are provided with flanges 120 and compression springs 121. By means of nuts 122 the position of movable plate 106 with respect to the lower extremities of secondary tubes 118 may be varied. Blind flange 114 is provided with bull plug 123 as an inspection port.

Referring now more particularly to the adsorbent inlet zone 107, the adsorbent, or other solid to be transferred, is introduced by means of coupling 125 into solids inlet zone 107. A plurality of secondary tubes 118, equal in number to and aligned with primary tubes 110 extend downwardly from flange 104. In this modification each of lift lines 100 is directly in line with one of secondary tubes 118, which latter tubes are directly in line with primary tubes 110. The lift gas passing upwardly through primary tubes 110 flows directly into the lower open ends of secondary tubes 118. The solids to be lifted settle downwardly as a moving solid bed around secondary tubes 118 so that each of secondary tubes 118 is provided with an even volumetric flow of solids around and into its lower extremity. In this manner a uniform quantity of gas-solid suspension is formed in each of secondary tubes 118 to pass therethrough out of solids inlet zone 107.

The secondary tubes 118 which are arranged in line, as hereinafter more fully described in connection with Figure 3, are provided with divider plates 127 which are welded in such a position that a free passageway for gas flow downwardly between adjacent secondary tubes 118 and between plates 127 is provided. The granular solids introduced into solids inlet zone 107 settle downwardly between plates of adjacent lines of secondary tubes 118 while a free gas space is maintained between plates 127 welded to a given line of secondary tubes 118. Coupling 128 is provided in the wall of solids inlet zone 107 for the introduction of or removal of gases. Couplings 117 and 128 are part of equipment, not shown in this figure but shown in Figure 5, to facilitate control of flow rates and lift gas velocities, suspension velocities hereinafter more fully described in Figure 5. In one modification of the control of the conveyance means gas is removed from solids inlet zone 107 by means of coupling 128. An increase in the flow rate of gas thus removed results in an increase in the countercurrent flow of lift gas from primary tubes 110 through the dense moving bed of granular solids outside of secondary tubes 118. This decreases the rate at which the solids are picked up by the lift gas and passed as a suspension upwardly through the lift line and consequently allows solids level 131 to rise and the solids level control is thus obtained. In another modification in which gas is introduced into solids inlet zone 107 through coupling 128, a concurrent gas flow may exist through the dense moving bed of granular solids between the lower extremity of plates 127 and secondary tubes 118, and into the secondary tubes with the lift gas. Increasing this concurrent gas flow results in increasing the rate at which solids are suspended in the lift gas and lowering solids level 131, level 131 tends to rise with decreased concurrent gas flows.

Within solids inlet zone 107 grid structure 130 is provided upon which frictional and gravitational forces of the moving bed of granular solids may act. Under normal operating conditions the surface of finely divided solids introduced into zone 107 lies along line 131 so that while the lower portion of grid structure 130 is covered by the solids, the upper portion is uncovered. Housing 132 is provided to contain control equipment adapted to be actuated by the forces acting upon grid structure 130 to indicate and control other equipment to maintain the level of solids 131 collecting in solids inlet zone 107 as above described.

Referring now more particularly to Figure 3, a cross sectional plan view of the lower portion of the solids inlet zone of Figure 2 is shown. Cylindrical wall 105, lift gas inlet 109, housing 132 in which the level control mechanism is situated, and three lines or rows of secondary tubes 118 are indicated. Plates 127 designated in Figure 2 also are shown welded along each side and extending around the ends of the three rows of secondary tubes providing free space 140 for gas flow. Grid structure 130 is also shown in the form of a yoke extending around the end of the central row of secondary tubes, but it may be positioned any place so that it is in partial contact with the adsorbent. This arrangement of tubes may be modified, if desired, so that the tubes form a square or triangular configuration, or they may be arranged to form a series of concentric hexagons around a central tube, or in other similar geometric patterns.

Figure 4 shows in greater detail a plan view of grid structure 130 in which secondary tubes 118 and plates 127 are also shown. The grid structure consists of a yoke 135 into which mesh 136 is fastened by means of rivets or bolts or other means 137. This form of grid structure may be modified, if desired, and other forms of structure employed such as slotted or perforated tubes, cylindrical or funnel-shaped meshes, and the like, by which the frictional and gravitational forces of the moving bed of solids are transmitted from grid structure 130 through suspension arm 138 to the level control mechanism not shown.

By way of example, the following data are given describing an apparatus similar to that shown and described in Figures 2, 3, and 4, and in which the solids conveyed were granular adsorbent charcoal having a mesh size of from 12 to about 20 mesh. The total height of the solids inlet zone and the gas inlet zone was about 6 feet, and the diameter of shell 105 was 20 inches. The primary, secondary and tertiary tubes employed in this apparatus were three inches in diameter and ten each were employed. The gas employed as lift gas was atmospheric air and continuous control of the charcoal level in the solids inlet zone was maintained according to the methods described above wherein the level control mechanism continuously bled air through control valve 158 from solids inlet zone 107 as shown in Figure 2. In this modification, the lift line comprising tubes 100 of Figure 2 were arranged in a vertical position, although satisfactory operation is possible with the conduit disposed angularly from the vertical. The suspension of charcoal in air thus formed was transported a distance of 40 feet, introduced into an impactless separator wherein the charcoal was separated, and the charcoal was returned for introduction into solids inlet zone 107 of Figure 2. The distance between moving tray 106 and the lower extremities of tubes 118 under these conditions was about 5/16 of an inch. Two modifications of orifice plates 111 were employed, the first being provided with a single 3/4 inch diameter sharp edge orifice and the other with nine 1/4 inch diameter sharp edge orifices. Of the two, the second modification is preferred since smoother operation resulted. In one run a charcoal circulation rate of 7.64 tons per hour was maintained at a lifting velocity through the lift line (tubes 100 in Figure 2) of 15.5 feet per second.

In another experimental run, a charcoal circulation rate of 16.9 tons per hour or 34,800 pounds per hour was maintained through the ten three-inch tubes comprising the lift line at a lifting velocity of 14.4 feet per second. The orifice pressure drop across orifice 111 was 19 inches of water, the pick-up pressure drop between primary tubes 113 and secondary tubes 118 was nine inches of water, and the individual pressure drops across each tube in the lift line averaged 20 inches of water, the deviation being less than 3% of that value. These data indicate very uniform loading of each tube in the lift line and stable operation at low lifting velocities.

Referring now more particularly to Figure 5, the induction detail involved in one modification of control of the apparatus according to this invention is shown together with a lift line consisting of a single conduit which may be tubular or of odd cross section such as square, hexagonal, elliptical, or other, and disposed at any angle with respect to the vertical. Solids inlet zone 107 together with lift gas inlet zone 108 is shown as before in Figure 2. The solids are passed by means of coupling 125 as before into solids inlet zone 107 which contains secondary tubes 118 and plates 127. Lift gas blower 150 introduces lift gas into header 151 wherein a portion of lift gas passes by means of line 152 controlled by automatic valve 153 at a constant volumetric flow rate into lift gas inlet zone 108. The remaining portion of this gas passes by means of line 153 controlled by valve 154 into the lower portion of the lift line or conduit 155 through which the lift gas-solids suspension is conveyed. A series of tertiary tubes 156 disposed in the lower portion of lift line 155 are aligned with secondary tubes 118 in solids inlet zone 107 so that the lift gas-solids suspension is introduced by means of tertiary tubes 156 directly into lift line 155. The second portion of lift gas is introduced directly into the lower portion of lift line 155 and acts to supplement the volume of gas passing up through tertiary tubes 156 so that the gas velocity in lift line 155 will not decrease to a value below the stalling velocity of the suspension due to the greater cross sectional area for flow. The relative adjustment of automatic control valve 153 and valve 154 determines the quantity of gas thus supplementing the lift gas passing upwardly through primary tubes 110, secondary tubes 118, and tertiary tubes 156.

Grid structure 130 lies in contact with the moving bed of solids collecting in solids inlet zone 107 and depending upon the level of these solids determines the adjustment of a control valve which acts to maintain the solids at a predetermined position. The solids move into the lift gas stream by flowing into the space between the primary and secondary tubes where the suspension is formed. In one modification, level control mechanism 132 acts to vary the adjustment of control valve 157 in which case control valve 158 may be completely shut off. Control valve 157 thus varies the flow rate of a portion of the lift gas introduced into gas inlet zone 108 from that zone through line 159, into the upper portion of solids inlet zone 107. Thus, when the solids level falls to a level below that desired, the level control mechanism closes control valve 157 to decrease the quantity of gas flowing down through the free space between secondary tubes 118 and plates 127, decreasing the quantity of gas flowing concurrently through the dense solids in inlet zone 107 which assists the pick-up of solids from zone 107, thereby lowering the solids pick-up rate. The solids level, therefore, tends to rise since a constant flow rate of solids is maintained into zone 107 by feeder 24, and adsorbent flow control valve 27 both shown in Figure 1. If the solids level rises, control valve 157 is opened increasing the quantity of gas assisting in the pick-up of solids from zone 107. The level control mechanism is more clearly described and claimed in my copending application Serial No. 775,554, filed September 22, 1947, now Patent No. 2,590,148.

In an alternative method, control valve 157 is closed and the level control mechanism 132 may be adapted to actuate control valve 158 so the fluctuating level of solids present in solids inlet zone 107 acts to open or close control valve 158 thereby varying the quantity of lift gas passing upwardly from gas inlet zone 108 countercurrently through the dense bed of moving solids in inlet zone 107 thereby decreasing the solids pick-up rate. In this manner the solids level tends to rise to its predetermined value.

In a third modification, level control mechanism 132 may be adapted to vary the adjustment of control valve 153 by means of which the quantity of lift gas passing upwardly through primary tubes 110 and into secondary tubes 118 may be varied. The predetermined solids level in solids inlet zone 107 is maintained by causing the level control mechanism 132 to increase the lift gas rate when the level is above the desired position and to decrease the lift gas rate when the level is low.

Referring now more particularly to Figure 6, a simplified modification in the lift line mechanism is shown containing one primary and one secondary tube and in which the movable plate previously described is employed to control the rate at which the granulated solids are introduced into the lift line. Induction zone 170 is provided with solids inlet zone 171 and lift gas inlet zone 172. Gas is introduced by means of connection 173 and the granular solids to be conveyed are introduced by means of transfer line 174 into solids inlet zone 171. The lift gas passes upwardly through primary tube 175, from gas inlet zone 172 into solids inlet zone 171, suspends a portion of the granular solids and the resulting suspension passes upwardly through secondary tube 176, a continuation of which comprises lift line 177. Primary tube 175 is provided with means for maintaining a flow of lift gas therethrough in straight flow lines by means of straightening vanes 190. The quantity of lift gas passing through is determined by means of primary orifice plate 191 and the inlet lift gas pressure. The orifice may be of the sharp edge type and is preferably provided with a multiplicity of orifices. At the bottom of primary tube 175 is provided a secondary orifice plate 192 into which a multiplicity of small holes is drilled having a total area at least equal to and preferably greater than twice the open area in primary orifice plate 191. The solids entering solids inlet zone 171 form a surface which lies along line 178.

In the selective adsorption apparatus the rate at which solids are withdrawn from the bottom of the selective adsorption column is controlled at a constant value by means of a reciprocating feeding mechanism and the solids flow control valve described above. This constant flow rate of solids passes downwardly into solids inlet zone 171 through transfer line 174 establishing solids level 178. It is essential for stable operation to remove solids from induction zone 170 and transfer them through lift line 177 at the same rate at which the solids are introduced. To accomplish this purpose in this modification, level control mechanism 179 is provided with grid structure 180 which may be a slotted tube, or cylindrical mesh or other, suspended by suspension rod 181. The position of solids level 178 with respect to grid structure 180 determines the magnitude of the frictional and gravitational forces of the moving granular solid acting on grid structure 180. Thus, level control mechanism 179 is able to detect the position of the solids level and vary control forces adaptable to maintaining solids level 178 at a constant desirable predetermined position.

In this modification level control mechanism 179 is shown connected by means of lines 182 and 183 to pneumatic headworks 184 and 185 which are positioned at the bottom of induction zone 170. These headworks have especially extended stems which form supporting rods 186 and 187 which are employed to support and vary the position of movable plate 188 with its attached primary tube 175. Braces 186a and 187a are provided for stability. The headworks are similar to those normally employed in pneumatic control valves. In this modification movable plate 188 is conical and primary tube 175 extends along the center axis of the cone. Mesh 193, also conical is placed across the upper opening of primary tube 175 to permit the solids to flow downwardly directly over the mesh. The upwardly rising lift gas then picks up the granular solids to form a suspension which subsequently passes upwardly through secondary tube 176 and lift line 177.

Distance D, which is the distance between the lower extremity of secondary tube 176 and movable plate 188 or the upper extremity of primary tube 175 has a very critical effect upon the rate at which granular solids flow from solids induction zone 171 into the bottom of secondary tube 176 and upwardly therethrough as a gaseous suspension. As distance D is decreased by raising plate 188 or lowering tube 176 the flow rate of granular solids is also decreased and since the rate of solids introduction is constant through line 174, solids level 178 tends to rise. The rise of the solids level is detected by grid structure 180 acting upon the level control mechanism 179 which in turn alters the pressure fluid to pneumatic headworks 184 and 185 in such a manner as to cause distance D to increase by moving movable plate 188. By increasing distance D, the flow rate of granular solids from solids inlet zone 171 into secondary tube 176 through which it is transported as a gaseous suspension, solids level 178 returns more nearly to its normal position. This combination has been found through industrial testing to form a very workable means by which the rate of solids conveyance may be controlled.

As shown in Figures 2, 3, 4 and 5 the primary tubes of the lift gas inlet zone, secondary tubes of the solids inlet zone, and the tertiary tubes or lift line tubes are all substantially the same diameter.

Although pneumatic variation of automatic flow control valves and the headworks mentioned above is shown, other means may be employed instead. Electrical or magnetic means may be employed if desired to achieve the same desirable continuous control. Magnetically operated control valves and electrical operated controllers are not outside the scope of this invention.

The above described drawings have shown the induction zone and its modifications in a vertical position. However, operation is not restricted to this position since the conveyance apparatus of this invention is operable in virtually any position. The vertical position is however often preferred when employed with the selective adsorption and similar apparatuses.

By way of comparison of the improved conveyance means of this invention with the conventional pneumatic lift line previously described, Figures 7 and 8 are presented shown actual operating data in which lift gas velocities in feet per second are plotted to the same scale.

Referring now more particularly to Figure 7, the operating characteristics of a conventional tubular lift line ten inches in diameter for transporting granulated solids are shown. Figure 7 shows the variation in pressure drops as a function of the gas velocity employed in the main lift line or conduit through which the solids suspension is conveyed in a conventional pneumatic lift line in which the particles to be suspended are introduced as a moving stream into the conduit through which the lift gas is passing. Curve 200 shows the variation in pressure drop exerted across the conduit when gases containing no suspended solids are circulated at various lineal gas velocities. Curve 201 shows the variation in pressure drop across the solids inlet point when 25,000 pounds per hour of granular solids are being suspended. This has been termed the "pick-up" pressure differential. Curve 202 gives the summation of these two pressure drops showing the variation in pressure differential across the entire conduit through which solids are transported.

A minimum is obvious in curve 202 showing a critical lineal gas velocity at which the lift line pressure drop is lowest. This minimum value bears a peculiar relationship to pneumatic lift line operation in that the apparatus is inoperable at velocities lower than that corresponding to the minimum differential pressure. Attempts to operate at velocities below this minimum velocity result in very rapid settling of the suspended particles of the gas stream which results in plugging the conduit with settled solid material halting the operation. The velocity at which this ocurs is defined as the "stalling velocity."

In such a conventional pneumatic lift line having a diameter of 10 inches conveying 10 to 30 mesh activated charcoal, the stalling velocity was found to be between about 25 and 30 feet per second necessitating operating lift gas lineal velocities of between about 30 and 40 feet per second so as to operate above the stalling velocity. Attrition rates are excessive at these velocities and in most cases it is preferable to employ a lift velocity of less than 35 feet per second.

Referring now more particularly to Figure 8, operating curves are shown for the solids conveyance apparatus of the present invention described above in which ten three-inch primary and secondary tubes are employed similar to that shown in Figure 2. In Figure 8, as in Figure 7, differential pressures are plotted against lineal lift gas velocities in feet per second. Curve 203 shows the variation in differential pressure across the lift line when gases containing no suspended solids are being circulated, and curve 204 shows the differential pressure existing between the upper extremity of primary tubes and lower extremity of the secondary tubes or the pick-up pressure drop when solids suspensions are being formed during actual operation in which 25,000 pounds per hour of granular solids are lifted. Curve 205 shows the summation of lift line differential pressures during actual operation and again the critical minimum or stalling velocity is apparent. Comparison of Figures 7 and 8, however, shows that the stalling velocity has been materially reduced, viz. to about 50% of its former value.

As an actual example of the apparatus from which the data in Figure 8 were taken, the lift conduit comprised a series of ten three-inch tubes and the data shown in Figures 7 and 8 were under the same solid conveyance rates. The stalling velocity of this apparatus was found to be less than about 14 feet per second and successfully steady operation was continuously maintained at a lineal gas velocity of as low at 14.4 feet per second. At these velocities, attrition rates are moderate and only a fraction of those encountered at the higher velocities.

It is highly desirable to reduce the operating lineal lift gas velocity to as low a value as possible and a lower limit of this velocity exists at the stalling velocity indicated. Whereas, the stalling velocity previously was about 30 feet per second for granular charcoal of the indicated mesh size, it has now been reduced to less than one-half that value. At these low lift line velocities the attrition rates of the solid material being conveyed are much reduced.

Attrition rates for any granular solids increase rapidly with increasing lift gas velocity and the maximum permissible lift velocity is generally determined by the maximum permissible attrition rate of the solid being handled. Generally, lift gas velocities of between below about 10 feet per second to as high as 100 feet per second may be employed depending upon the density of the particular solid being handled, the density and the viscosity of the lift gas, and the permissible attrition rate.

The stalling velocity will vary with different solids since those solids having high densities will have high stalling velocities and vice versa. For granular charcoal, the stalling velocity, as above indicated, is less than about 14 feet per second in the conveyance apparatus of this invention and the desirable lift gas velocities for these solids are less than about 30 feet per second and preferably less than about 20 feet per second. Under some conditions lift gas velocity of as high as 50 feet per second may be employed. Velocities in the lower range, however, are preferred from an attrition loss standpoint.

The conveyance apparatus of the present invention is primarily directed toward the improved conveyance of granulated solids in the form of suspensions in gases whereby suspension may be formed more easily and with decreased accompanying pressure drops in the gas stream. An inherent characteristic of the apparatus is the reduced stalling velocity or the minimum velocity with which the solids-lift gas suspension may be transported without causing settling of the suspended solids. The apparatus allows gaseous suspensions of solids to be conveyed at reduced velocities and consequently with reduced losses due to attrition. In many processes this is a characteristic of the utmost importance. This situation is particularly true in the case of processes and apparatuses for the separation of gaseous mixtures by continuous selective adsorption as hereinabove described, and is also true in catalytic and other processes.

Although the present apparatus of this invention is admirably well adapted to use with the selective adsorption apparatus and process herein described, the description involved is not intended to limit the improved apparatus of this invention to such uses alone since this apparatus may be applied to any other apparatus or process in which granulated or powdered or other finely divided solids are handled. Furthermore, this method for the conveyance of granular solids is operable at any pressure and the lift gas velocities required decrease with increasing pressure due to buoyancy and viscosity effects.

Although the selective adsorption process according to this invention has been described and illustrated in connection with the production of ethylene, it may be applied to the separation of other gaseous mixtures such as carbon dioxide as a high purity stream from such gaseous mixtures containing that constituent as fermentation gases or flue gases, and the like, or it may be separated from carbon monoxide. Sulfur dioxide may be separated as a pure stream from sulfur burner flue gases and ore roasting furnace gases such as those treating pyrites, etc.

The selective adsorption process herein applied to ethylene production may also be utilized in recovery of acetylene from its gaseous mixtures obtained from thermal or catalytic cracking operations. Production of acetylene-containing gases is also possible through various electric arc and partial oxidation processes in which natural gas, for example, is pyrolyzed, and economical high purity acetylene production results when these gases are purified by continuous selective adsorption.

Highly efficient separations of $C_2$ hydrocarbons including ethane, ethylene, and acetylene, may be effected from either $C_1$ or $C_3$ and $C_4$ hydrocarbon mixtures. Natural gas fractionation may be carried out easily and at moderate temperature and pressure conditions in the selective adsorption process with the production of high purity $C_1$, $C_2$, and $C_3$ and heavier hydrocarbons as overhead side cut and bottoms fractions.

Hydrogen is an important gaseous reagent in many chemical reactions and raw material in many other industrial operations. Cheap high purity hydrogen is readily separated from cracked gases, coke oven gases, hydroformer make gases, and almost any other gas containing hydrogen.

The induction zone and the lift line conduits described herein in connection with the selective adsorption process need not be disposed in a vertical position in order to achieve the inherent benefits described. The position of the level control mechanism and the grid structure may be altered so that the grid is partly covered by solids when the apparatus operates in a tilted or even horizontal position. The apparatus is admirably well suited to the conveyance of powdered or pulverized fuels in which the lift gas comprises primary air and the suspension is passed through the conduit at any angle from the induction zone through a burner and into a furnace.

This application is a division of my copending application Serial No. 18,913 filed April 5, 1948, now abandoned.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for the conveyance of granular solids which comprises an induction chamber provided with a transverse plate dividing said induction chamber into a solids inlet chamber surrounding a plurality of suspension chambers above said plate and a lift gas inlet chamber below said plate, a plurality of primary tubes attached to said transverse plate and projecting into said lift gas inlet chamber, one each of said primary tubes being coaxially aligned with one each of said plurality of suspension chambers, a plurality of elongated conveyance conduits communicating coaxially one each with said plurality of suspension chambers, a conduit for gas opening into said lift gas inlet chamber, an inlet conduit for solids into said solids inlet chamber whereby said suspension chambers are surrounded with a moving bed of said solids, and a level detecting means sensitive to variations in the solids level supported in contact with said moving bed of solids in said solids inlet chamber, said detecting means being adapted to vary the rate of flow of granular solids from said solids inlet chamber into said suspension chambers to maintain a substantially constant solids level in said solids inlet chamber.

2. An apparatus according to claim 1 wherein said primary tubes have a plurality of vanes mounted therein and arranged to provide a plurality of parallel linear flow paths.

3. An apparatus according to claim 2 in combination with at least one orifice mounted in the upstream end of said primary tubes and adapted to establish a subtsantially uniform distribution of said lift gas into each of said primary tubes from said lift gas inlet chamber.

4. An apparatus according to claim 2 wherein said primary tubes are provided with a primary orifice plate mounted transverse within each of said plurality of primary tubes at a point upstream from said vanes, said orifice plate being provided with a multiplicity of orifices, each of said primary tubes being further provided with a secondary orifice plate mounted midstream from said primary orifice plate and provided with at least one orifice having a total open area at least equal to the open orifice area of said primary orifice plate.

5. An apparatus for the conveyance of granular solids which comprises an induction chamber provided with a transverse plate dividing said induction chamber into a solids inlet chamber surrounding a plurality of suspension chambers above said plate and a lift gas inlet chamber below said plate, a plurality of primary tubes attached to said transverse plate and projecting into said lift gas inlet chamber and aligned one each with said plurality of suspension chambers, a plurality of elongated conveyance conduits communicating one each with each of said plurality of suspension chambers, a conduit for gas into said lift gas inlet chamber, an inlet conduit for solids into said solids inlet chamber, a solids level detecting means sensitive to variations in the solids level established in said solids inlet chamber, a control gas conduit opening from said lift gas inlet chamber external to said induction chamber and into said solids inlet chamber above the solids level therein, said conduit being provided with a flow control valve and a level control instrument actuated by said level detecting means and adapted to operate said flow control valve to maintain said solids level at a substantially constant position.

6. An apparatus for the conveyance of granular solids which comprises an induction chamber provided with a transverse plate dividing said induction chamber into a solids inlet chamber surrounding a plurality of suspension chambers above said plate and a lift gas inlet chamber below said plate, a plurality of primary tubes attached to said transverse plate and projecting into said lift gas inlet chamber and aligned one each with each of said plurality of suspension chambers, a plurality of elongated conveyance conduits communicating one each with each of said plurality of suspension chambers, a conduit for gas into said lift gas inlet chamber, an inlet conduit for solids into said solids inlet chamber, solids level detecting means sensitive to variations in the solids level established in said solids inlet chamber, said transverse plate being movable within said induction chamber, a control instrument responsive to the detected changes in said level and actuated by said detecting means and means for moving said transverse plate in response to the detected level variations to maintain said solids level in a substantially constant position.

7. An apparatus for the conveyance of granular solids which comprises an induction chamber provided with a transverse plate dividing said induction chamber into a solids inlet chamber surrounding a plurality of suspension chambers above said plate and a lift gas inlet chamber below said plate, a plurality of primary tubes attached to said transverse plate and projecting into said lift gas inlet chamber and aligned one each with each of said plurality of suspension chambers, a plurality of elongated conveyance conduits communicating one each with each of said plurality of suspension chambers, a conduit for gas into said lift gas inlet chamber, an inlet conduit for solids into said solids inlet chamber, solids level detecting means sensitive to variations in the solids level established in said solids inlet chambers, a control conduit for gas from said solids inlet chamber at a point above the level of solids therein, flow control valve associated with said control conduit and a control instrument responsive to said level detecting means and adapted to actuate said flow control valve to maintain said solids level at a substantially constant position.

8. An apparatus for the conveyance of granular solids which comprises an induction chamber provided with a transverse plate dividing said induction chamber into a solids inlet chamber surrounding a plurality of suspension chambers above said plate and a lift gas inlet chamber below said plate, a plurality of primary tubes attached to said transverse plate and projecting into said lift gas inlet chamber and aligned one each with one each of said plurality of suspension chambers, a plurality of elongated conveyance conduits communicating one each with one each of said plurality of suspension chambers, a conduit for gas into said lift gas inlet chamber, an inlet conduit for solids into said solids inlet chamber, a solids level detecting means sensitive to variations in the solids level established in said solids inlet chamber, a flow control valve associated with said inlet conduit for lift gas into said lift gas inlet chamber, a flow control instrument responsive to the detected changes and actuated by said level detecting means and adapted to actuate said flow control valve to maintain said solids level at a substantially constant position.

9. A method for the conveyance of granular solids which comprises establishing an induction zone provided with a solids inlet zone containing at least one suspension zone and a lift gas inlet zone communicating therewith, introducing said granular solids into said solids inlet zone to surround said suspension zone, maintaining a substantially constant solids level within said solids inlet zone, introducing lift gas into said lift gas inlet zone, passing lift gas at a relatively low velocity linearly from said lift gas inlet zone into and through said suspension zone, flowing solids at a controlled rate from said solids inlet zone into said suspension zone uniformly through the periphery thereof and into the linear flow of lift gas passing from said lift gas inlet zone into and through said suspension zone, controlling the rate of solids flow into said suspension zone in accordance with variations in said solids level to maintain said solids level at a substantially constant position in said solids inlet zone, and discharging the resulting suspension into an elongated conveyance zone.

10. A method according to claim 9 wherein the rate of introduction of said solids from said solids inlet zone into said suspension zone is controlled in accordance with slight variations in said solids level in said solids inlet zone by the steps of removing a portion of said lift gas from said lift gas inlet zone, introducing the gas thus removed into said solids inlet zone above said solids level therein, passing the thus introduced gas concurrently with the flow of granular solids from said solids inlet zone below said solids level therein and into said linear flow of lift gas flowing from said lift gas inlet zone into and through said suspension zone to vary the rate at which solids flow from said solids inlet zone into said suspension zone and varying the quantity of lift gas thus passed from said lift gas inlet zone into said solids inlet zone to maintain said solids level therein at a substantially constant position.

11. A method according to claim 9 wherein the rate of introduction of said solids from said solids inlet zone into said suspension zone is controlled by the steps of removing a variable portion of gas from said solids inlet zone above said solids level thereby varying the quantity of lift gas passing from said lift gas inlet zone into said solids inlet zone countercurrently to the moving bed of granular solids in said solids inlet zone flowing into said suspension zone from below said solids level and controlling the quantity of gas thus removed from said solids inlet zone in accordance with variations in said solids level to maintain said level at a substantially constant position.

12. A method according to claim 9 wherein the rate at which solids flow from said solids inlet zone into said suspension zone is controlled in accordance with slight variations in the solids level maintained at a substantially constant position in said solids inlet zone by the step of varying the rate at which lift gas is introduced into said lift gas inlet zone.

13. A method according to claim 9 wherein the rate at which solids flow from said solids inlet zone into said suspension zone is controlled by varying the cross sectional area of the communicating opening through which said solids pass therebetween.

14. A method for the continuous conveyance of granular solids which comprises establishing an induction zone provided with a solids inlet zone, a lift gas inlet zone communicating therewith, and a suspension zone surrounded by said solids inlet zone, continuously introducing said granular solids into said solids inlet zone to surround said suspension zone, maintaining a substantially constant level of solids therein, introducing a portion of said lift gas into said lift gas inlet zone, passing said lift gas along substantially linear flow lines at relatively low velocities therefrom into and through said suspension zone, simultaneously passing solids from said solids inlet zone uniformly throughout the periphery of and into said linear flow of said lift gas stream thus flowing through said suspension zone to form a lift gas-solids suspension thereof, injecting another portion of said lift gas directly into the suspension thus formed, and conveying the resulting mixture from said suspension zone linearly through an elongated conveyance zone.

15. An apparatus for the conveyance of granular solids which comprises an induction chamber provided with a movable transverse plate dividing said induction chamber into a solids inlet chamber containing at least one suspension chamber and a lift gas inlet chamber, at least one primary tube attached to said movable transverse plate and extending into said lift gas inlet chamber, at least one secondary tube as a suspension chamber positioned in said solids inlet chamber spaced apart from and coaxially aligned with a primary tube of said gas inlet chamber, at least one elongated conveyance conduit coaxially aligned with said secondary tube through which said granular solids are conveyed as a suspension, means for introducing granular solids into said solids inlet zone to surround said secondary tube with a bed of said solids, means for introducing a lift gas into said lift gas inlet chamber to pass through said primary tubes into and through said suspension chamber and into said conveyance conduit, the coaxial alignment being adapted to maintaining such flow of lift gas in substantially straight flow lines throughout said primary and secondary tube and said conveyance conduit and level control means adapted to maintain a substantially constant level of granular solids in said solids inlet zone.

16. An apparatus according to claim 15 wherein said transverse plate dividing said induction chamber comprises a funnel-shaped member and said primary tube depends from the apex thereof.

17. An apparatus according to claim 15 wherein a plurality of said secondary tubes as suspension chambers are provided in a regular geometric arrangement parallel to one another within said solids inlet chamber, said secondary tubes being provided with gas conduit means external thereto and extending from above the solids level within said solids inlet chamber to a point adjacent the point at which solids flow therefrom into said suspension chamber, said gas conduit means being inaccessible to the flow of solids therethrough and adapted to permit the passage of a variable quantity of gas therethrough and subsequently through a bed of granular solids of uniform thickness above said point at which solids flow into each of said suspension chambers to vary the rate at which said granular solids flow thereinto from said solids inlet chamber.

18. An apparatus according to claim 17 wherein said secondary tubes as suspension chambers are disposed in rows in said regular geometric arrangement, a pair of plates attached one to each side of each row of said secondary tubes thereby providing a free gas space inaccessible to flow of solids between adjacent secondary tubes and between said plates of each row and adapted to permit said gas flow therebetween.

19. An apparatus for the conveyance of granular solids which comprises an induction chamber provided with a transverse plate dividing said induction chamber into a solids inlet chamber containing at least one suspension chamber and a lift gas inlet chamber, at least one primary tube attached to said transverse plate and extending into said lift gas inlet chamber, at least one secondary tube as a suspension chamber positioned in said solids inlet chamber spaced apart from and coaxially aligned with a primary tube of said gas inlet chamber, at least one elongated conveyance conduit coaxially aligned with said secondary tube through which said granular solids are conveyed as a suspension, means for introducing granular solids into said solids inlet chamber to surround said secondary tube with a bed of said solids, means for introducing a lift gas into said lift gas inlet chamber to pass through said primary tube into and through said suspension chamber and into said conveyance conduit, level control means adapted to maintain a substantially constant level of granular solids in said solids inlet zone, a control gas conduit opening from said lift gas inlet chamber into said solids inlet chamber at a point above the solids level therein and flow control valve means in said control gas conduit adapted to vary the quantity of control gas flowing therethrough to change the rate of introduction of granular solids from said solids bed in said solids inlet chamber into said suspension chamber.

20. An apparatus for the conveyance of granular solids which comprises an induction chamber provided with a transverse plate dividing said induction chamber into a solids inlet chamber containing at least one suspension chamber and a lift gas inlet chamber, at least one primary tube attached to said transverse plate and extending into said lift gas inlet chamber, at least one secondary tube as a suspension chamber positioned in said solids inlet chamber spaced apart from and coaxially aligned with a primary tube of said gas inlet chamber, at least one elongated conveyance conduit coaxially aligned with said secondary tube through which said granular solids are conveyed as a suspension, means for introducing granular solids into said solids inlet chamber to surround said secondary tube with a bed of said solids, means for introducing a lift gas into said lift gas inlet chamber to pass through said primary tube into and through said suspension chamber and into said conveyance conduit, level control means adapted to maintain a substantially constant level of granular solids in said solids inlet zone, a control conduit for gas opening from said solids inlet chamber at a point above the level of solids therein, and a flow control valve associated with said control conduit and adapted to vary the quantity of gas removed from said solids inlet chamber thereby varying the rate at which solids flow from said bed of solids in said solids inlet chamber into said suspension chamber.

21. A method for the conveyance of granular solids which comprises establishing an induction zone provided with a solids inlet zone containing at least one suspension zone and a lift gas inlet zone communicating therewith, introducing said granular solids into said solids inlet zone to surround said suspension zone, maintaining a substantially constant solids level within said solids inlet zone, introducing lift gas into said lift gas inlet zone, passing said lift gas at a relatively low velocity linearly from said lift gas inlet zone into and through said suspension zone, flowing solids at a controlled rate from said solids inlet zone into said suspension zone uniformly through the periphery thereof and into the linear flow of lift gas passing from said lift gas inlet zone into and through said suspension zone, and controlling the rate of solids flow from said solids inlet zone into said suspension zone by the steps of removing a portion of said lift gas from said lift gas inlet zone, and introducing said portion of lift gas into said solids inlet zone above said solids level therein for subsequent passage concurrently with the flow of granular solids from said solids inlet zone below said solids level therein and into said linear flow of lift gas flowing from said lift gas inlet zone into and through said suspension zone.

22. A method for the conveyance of granular solids which comprises establishing an induction zone provided with a solids inlet zone containing at least one suspension zone and a lift gas inlet zone communicating therewith, introducing said granular solids into said solids inlet zone to surround said suspension zone, maintaining a substantially constant solids level within said solids inlet zone, introducing lift gas into said lift gas inlet zone, passing said lift gas at a relatively low velocity linearly from said lift gas inlet zone into and through said suspension zone, flowing solids at a controlled rate from said solids inlet zone into said suspension zone uniformly through the periphery thereof and into the linear flow of lift gas passing from said lift gas inlet zone into and through said suspension zone, and controlling the rate of solids flow from said solids inlet zone into said suspension zone by the steps of removing a portion of gas from said solids inlet zone at a point above the level of said solids therein, and varying the flow rate of said portion of gas thereby varying the quantity of lift gas passing from said lift gas inlet zone into and through said solids inlet zone countercurrently to the moving bed of granular solids in said solids inlet zone.

23. A method for the continuous conveyance of granular solids which comprises establishing an induction zone provided with a solids inlet zone, a lift gas inlet zone communicating therewith, and a suspension zone surrounded by said solids inlet zone, continuously introducing said granular solids into said solids inlet zone to maintain a compact moving bed of solids surrounding said suspension zone, maintaining a substantially constant level of solids therein, introducing a portion of said lift gas into said lift gas inlet zone, passing said lift gas along substantially linear flow lines at relatively low velocities therefrom into and through said suspension zone, simultaneously passing solids from said solids inlet zone uniformly substantially throughout the periphery of and into said linear flow of said lift gas stream thus flowing through said suspension zone to form a lift gas-solids suspension thereof and passing another portion of said lift gas through said bed of solids so as to control the ratio of passage of said solids into said suspension zone.

24. Apparatus for elevating granular material by means of a gaseous lift medium comprising a plurality of closely-spaced parallel suspension pipes a plurality of primary pipes each having substantially the same diameter as said suspension pipes and being coaxially aligned therewith in spaced relationship with the lower ends thereof, means for introducing a gaseous lift medium from a common source through said primary pipes into the lower ends of said pipes, a chamber adapted to maintain a compact moving bed of said granular material surrounding the lower ends of said pipes, and to permit separate streams of said granular material to pass into said lower ends, and means for introducing a controlled amount of additional gaseous lift medium into said chamber above said compact moving bed of granular material.

25. Apparatus as defined in claim 24 including a relatively large-size lift pipe having its lower end encompassing the upper end portions of said plurality of suspension pipes and forming a vertical extension thereof, closure means sealing the spaces between the lower end of said large-size life pipe and said plurality of suspension pipes, and means for introducing the additional gaseous lift medium into the lower end of said large-size lift pipe at a level substantially below the discharge level of said plurality of suspension pipes.

26. Apparatus as defined in claim 24, including additional means for removing a controlled amount of gaseous lift medium from said chamber at a point above said moving bed.

References Cited in the file of this patent

UNITED STATES PATENTS

| 2,624,695 | Ivey et al. | Jan. 6, 1953 |
| 2,625,442 | Kollgaard | Jan. 13, 1953 |

UNITED STATES PATENT OFFICE

CERTIFICATE OF CORRECTION

Patent No. 2,921,817

January 19, 1960

Clyde H. O. Berg

It is hereby certified that error appears in the printed specification of the above numbered patent requiring correction and that the said Letters Patent should read as corrected below.

Column 18, line 26, for "midstream" read -- upstream --; column 19, line 14, for "chambers" read -- chamber --; column 24, line 3, for "life" read -- lift --.

Signed and sealed this 16th day of August 1960.

(SEAL)
Attest:

KARL H. AXLINE
Attesting Officer

ROBERT C. WATSON
Commissioner of Patents